United States Patent
Chiang et al.

(10) Patent No.: US 10,466,833 B2
(45) Date of Patent: Nov. 5, 2019

(54) TOUCH CONTROL DEVICE COMPRISING PRESSURE-SENSING LAYER AND FLAT TOUCH SENSING LAYER

(71) Applicant: TPK Touch Solutions (Xiamen) Inc., Xiamen (CN)

(72) Inventors: Cheng-Chung Chiang, Kaohsiung (TW); Ho-Hsun Chi, Hsinchu (TW); Yuh-Wen Lee, Zhubei (TW)

(73) Assignee: TPK Touch Solutions(Xiamen) Inc., Xiamen (CN)

( * ) Notice: Subject to any disclaimer, the term of this patent is extended or adjusted under 35 U.S.C. 154(b) by 0 days.

(21) Appl. No.: 15/176,161

(22) Filed: Jun. 8, 2016

(65) Prior Publication Data

US 2016/0364071 A1    Dec. 15, 2016

(30) Foreign Application Priority Data

Jun. 10, 2015    (CN) .......................... 2015 1 0315036

(51) Int. Cl.
```
G06F 3/041      (2006.01)
G02F 1/1333     (2006.01)
G02F 1/1335     (2006.01)
G02F 1/1343     (2006.01)
G02F 1/1368     (2006.01)
G06F 3/044      (2006.01)
```

(52) U.S. Cl.
CPC .......... *G06F 3/0416* (2013.01); *G02F 1/1368* (2013.01); *G02F 1/13338* (2013.01); *G02F 1/13439* (2013.01); *G02F 1/133345* (2013.01); *G02F 1/133514* (2013.01); *G02F 1/133528* (2013.01); *G02F 1/134309* (2013.01); *G06F 3/044* (2013.01); *G06F 3/0412* (2013.01); *G06F 3/0414* (2013.01); *G02F 2001/133357* (2013.01); *G02F 2202/28* (2013.01); *G06F 2203/04105* (2013.01); *G06F 2203/04106* (2013.01); *G06F 2203/04111* (2013.01)

(58) Field of Classification Search
CPC ........................................................ G09G 3/041
USPC .................................................. 345/173–178
See application file for complete search history.

(56) References Cited

U.S. PATENT DOCUMENTS

| | | | | |
|---|---|---|---|---|
| 2007/0291016 A1* | 12/2007 | Philipp | ............... | G01D 5/2405 345/174 |
| 2010/0128002 A1* | 5/2010 | Stacy | ..................... | G06F 3/016 345/174 |

(Continued)

*Primary Examiner* — Roy P Rabindranath
(74) *Attorney, Agent, or Firm* — Cooper Legal Group, LLC

(57) ABSTRACT

A touch control device is provided. A protective cover protects the touch control device and includes a top-surface to sustain a touch action performed by the user. A flat touch sensing layer includes many first direction-detection electrodes second direction-detection electrodes. The fast and second direction-detection electrodes are isolated by a transparent insulating material at the position where the first direction-detection electrodes cross the second direction-detection electrodes. The first and second direction-detection electrodes constitute a flat sensing pattern. A pressure-sensing layer is disposed between the protective cover and the flat touch sensing layer and includes at least one pressure-sensing unit constituting a first pattern. The overlap ratio between the projection of the first pattern onto the flat touch sensing layer and the flat sensing pattern is less than or equal to about 5% of the flat sensing pattern.

20 Claims, 11 Drawing Sheets

(56) References Cited

U.S. PATENT DOCUMENTS

| | | | | |
|---|---|---|---|---|
| 2011/0221687 A1* | 9/2011 | Liu | ................... | G02F 1/13338 |
| | | | | 345/173 |
| 2011/0248941 A1* | 10/2011 | Abdo | ................... | G06F 3/0488 |
| | | | | 345/173 |
| 2013/0265256 A1* | 10/2013 | Nathan | ................ | G06F 3/0414 |
| | | | | 345/173 |
| 2014/0022208 A1* | 1/2014 | Wu | ................... | H03K 17/9622 |
| | | | | 345/174 |

* cited by examiner

TOUCH CONTROL DEVICE COMPRISING PRESSURE-SENSING LAYER AND FLAT TOUCH SENSING LAYER

CROSS REFERENCE TO RELATED APPLICATIONS

This Application claims priority of China Patent Application No. CN201510315036.3,filed on Jun. 10, 2015, the entirety of which is incorporated by reference herein.

BACKGROUND

Technical Field

The disclosure relates to a touch control device, and more particularly to a touch control device with a three-dimensional (3D) detection function.

Description of the Related Art

Touch control devices are human-computer interaction devices which are in common use today. When a user sees text or figures displayed on a screen disposed on the back of a touch control device, and touches the position displaying the text or figures, the touch control device detects touch signals and transmits the touch signals to a controller. The controller processes the signals to generate output signals corresponding to the position touched. Common detection methods include a resistive detection method, a capacitive detection method, an infrared-ray detection method, and a surface acoustic wave detection method. For example, a capacitive detection system utilizes capacitors to serve as detectors. Therefore, when the user touches different positions, the detection system calculates the amount of change in all capacitors and generates output t signals corresponding to the touched position.

In recent years, a pressure detection device that detects the strength of the touch has become increasingly popular.

BRIEF SUMMARY OF THE DISCLOSURE

In accordance with one or more embodiments of the disclosure, a touch control device comprises a protective cover, a flat touch sensing layer, and a pressure-sensing layer. The protective cover is configured to protect the touch control device and comprises a top-surface to sustain a touch action performed by the user. The flat touch sensing layer comprises a plurality of first direction-detection electrodes and a plurality of second direction-detection electrodes. The first and second direction-detection electrodes are isolated by a transparent insulating material at the position where the first direction-detection electrodes cross the second direction-detection electrodes. The first and second direction-detection electrodes constitute a flat sensing pattern. The pressure-sensing layer is disposed between the protective cover and the flat touch sensing layer and comprises at least one pressure-sensing unit constituting a first pattern. The overlap ratio between the projection of the first pattern onto the flat touch sensing layer and the flat sensing pattern is less than or equal to about 5% of the flat sensing pattern.

A detailed description is given in the following embodiments with reference to the accompanying drawings.

DETAILED DESCRIPTION OF THE DISCLOSURE

The making and use of the embodiments of the disclosure are discussed in detail below. It Should be appreciated, however, that the embodiments provide many applicable. inventive concepts that can be embodied in a wide variety of specific contexts. The specific embodiments discussed are merely illustrative, and do not limit the scope of the disclosure.

Figure 1:
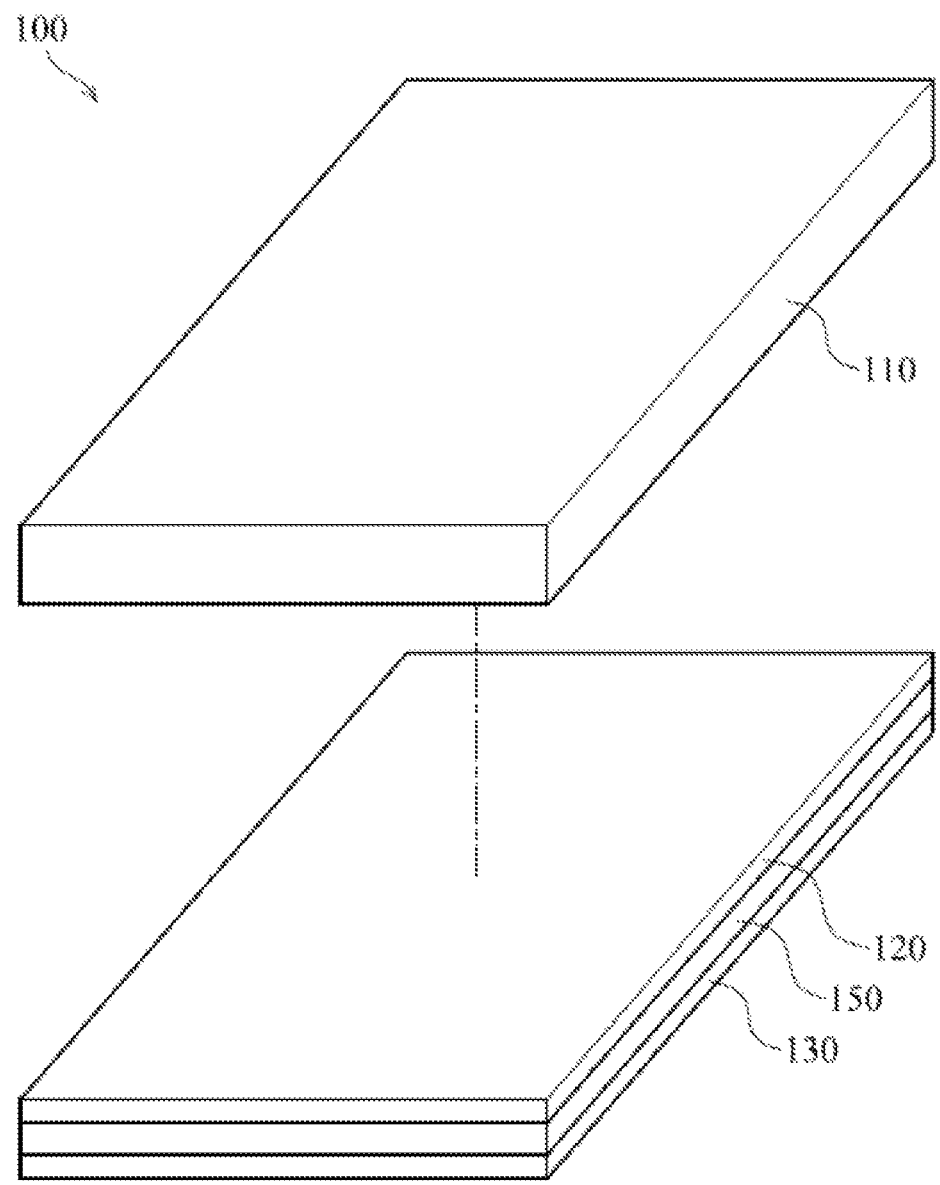
FIG. 1 is a schematic diagram of a touch control device, in accordance with sonic embodiments of the disclosure.

FIG. 1 is a schematic diagram of a touch control device, in accordance with some embodiments of the disclosure. The touch control device 100 is a mobile electronic device, such as tablet computer, desktop computer, electronic paper, smartphone or the like. As shown in FIG. 1, the touch control device 100 comprises a protective cover 110, a pressure-sensing layer 120 and a flat touch sensing layer 130. In some embodiments, the pressure-sensing layer 120 is formed on a first surface of a substrate 150 and the flat touch sensing layer 130 is formed on a second surface of the substrate 150, wherein the first surface is opposite to the second surface. hi some embodiments, the pressure-sensing layer 120 is attached to the protective cover 110 by an optically clear adhesive. The material of the protective cover 110 is a reinforced rigid plate, such as a rigid plastic, a rigid glass or alumina. The protective cover 110 is configured to protect the touch control device 100. The top surface of the protective cover 110 sustains a touch action performed by the user.

The pressure-sensing layer 120 is disposed between the protective cover 110 and the flat touch sensing. layer 130 and comprises at least one pressure-sensing unit (not shown). The pressure-sensing unit constitutes a pattern. When the user performs a touch action on the top surface of the protective cover 110, the strength of the touch action changes the shape of the pattern in the pressure-sensing layer 120. Therefore, the resistance of the pressure-sensing unit is changed. When the protective cover 110 is touched with different strengths, the changes of the shape of the pattern in the pressure-sensing layer 120 are different such that the pressure-sensing unit generates different resistances. Therefore, the strength of the touch action can be obtained according, to the detection of the resistance of the pressure-sensing unit of the pressure-sensing layer 120. The detection of the resistance is to detect the change of the touch action in the Z-direction winch is normal to the plane of the pressure-sensing layer 120.

The flat touch sensing layer 130 comprises a plurality of first direction-detection electrodes (riot shown) and a plurality of second direction-detection electrodes (not shown). The first and second direction-detection electrodes are isolated by a transparent insulating material at the position where the first direction-detection electrodes cross the second direction-detection electrodes. The first and second direction-detection electrodes constitute a flat sensing pattern. In some embodiments, the first and second direction-detection electrodes are formed on the same surface of a substrate. Therefore, the flat touch sensing layer 130 is referred to as a single indium tin oxide (SITO) structure.

When the user performs a touch action on the top surface of the protective cover 110, the position of the touch action changes the capacitance of the capacitor between the first and second direction-detection electrodes. Therefore, the position of the touch action can be obtained according to the change of the capacitance of the flat touch sensing layer.

In some embodiments, since the flat touch sensing layer 130 has a touch control function for two-dimensional (2D) sensing, and the pressure-sensing layer 120 provides a detection result for the Z-dimension, the touch control device 100 has three-dimensional (3D) touch control function to detect changes in three directions. In some embodiments, the material of the substrate 150 is plastic or alumina, but the disclosure is not limited thereto.

Since the pressure-sensing layer 120 is closer to the protective cover 110 than the flat touch sensing layer 130, the pressure signal of the touch action is more responsive to the pressure-sensing layer 120. In some embodiments, the pressure-sensing layer comprises at least one pressure-sensing unit constituting a first pattern. The overlap ratio between the projection of the first pattern onto the flat touch sensing layer 130 and the flat sensing pattern is less than or equal to about 5% of the flat sensing pattern. Therefore, signals interference by the first pattern to the flat sensing pattern is avoided.

Figure 2:
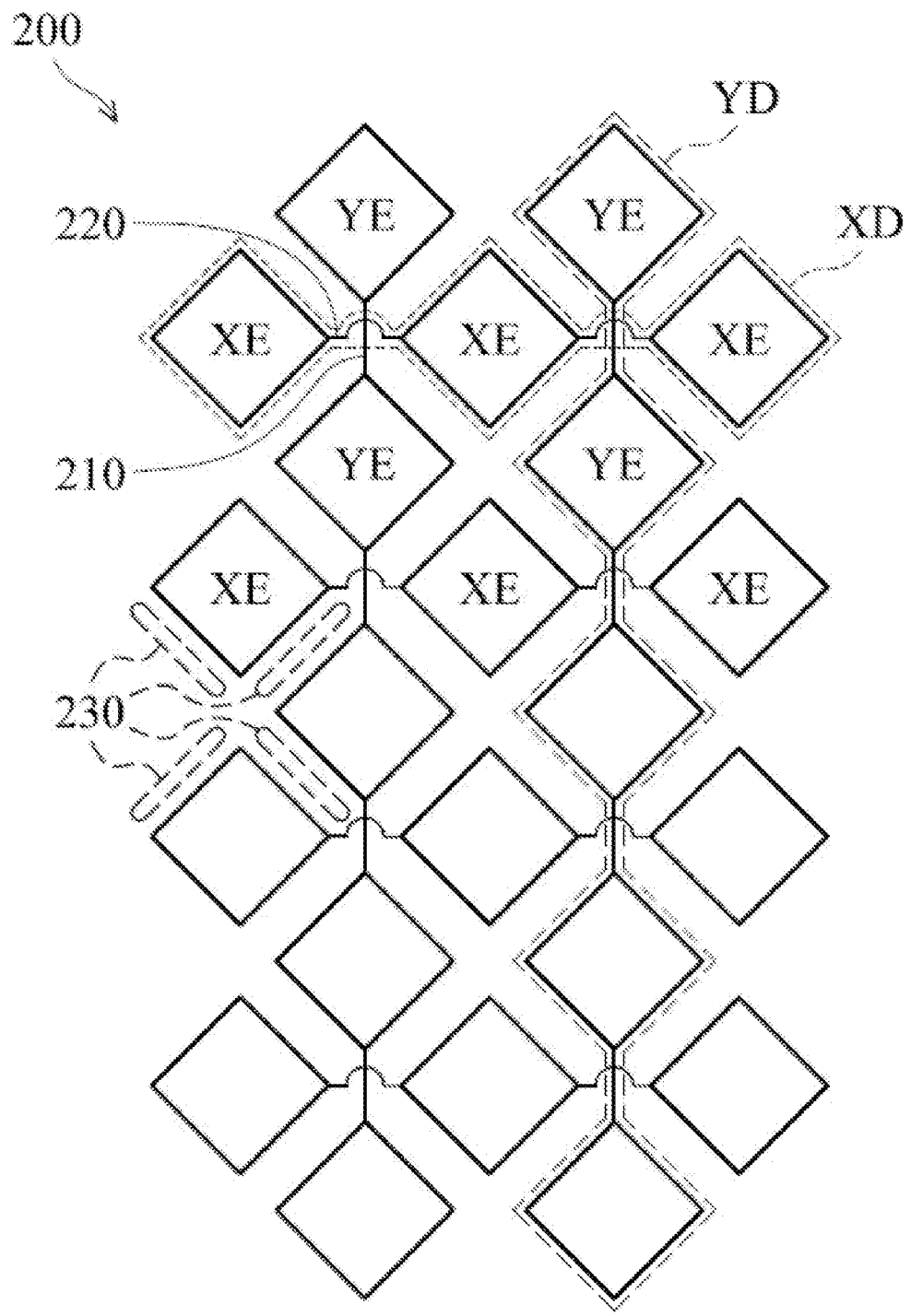
FIG. 2 is a schematic diagram of a flat touch sensing layer, in accordance with some embodiments of the disclosure

FIG. 2 is a schematic diagram of a flat touch sensing layer, in accordance with some embodiments of the disclosure. As described previously, the flat touch sensing layer comprises a plurality of first and second direction-detection electrodes. For clarity, only some of the first and second direction-detection electrodes are shown. In some embodiments, the first direction-detection electrodes XD and the second direction-detection electrodes YD are formed on the same surface of a substrate. In other words, the first and second direction-detection electrodes are formed in the same plane. Therefore, the structure shown in FIG. 2 is referred to as a single indium tin oxide (SITO) and serves as a flat touch sensing layer.

In some embodiments, the flat sensing pattern 200 is composed of the first direction-detection electrodes XD and the second direction-detection electrodes YD. As shown in FIG. 2, each of the first direction-detection electrodes XD comprises a plurality of first direction-detection block-formed electrodes XE and a plurality of first connection lines 220. (Block-formed electrodes referred here and after means the electrodes can be rhombus-Shaped, squares-Shaped, hexagons-shaped and the like.) Each of the first connection lines 220 is electrically connected between two neighboring block-formed electrodes XE. Each of the second direction-detection electrodes YD comprises a plurality of second direction-detection block-formed electrodes YE and a plurality of second connection lines 210. Each of the second connection lines 210 is electrically connected between two neighboring block-formed electrodes YE.

When a user applies a touch action, the capacitance between the corresponding first direction-detection block-formed electrode XE and the corresponding second direction-detection block-formed electrodes YE is changed. Therefore, the touched position can be obtained according to the detection of the capacitance. In some embodiments, the first direction-detection block-formed electrodes XE and the second direction-detection block-formed electrodes YE constitute a second pattern. The projection of the second pattern onto the pressure sensing layer 120 does not overlap the first pattern of the pressure-sensing layer 120. In other words, an etching interval 230 is disposed between each of the first direction-detection block-formed electrodes XE and each of the second direction-detection block-formed electrodes YE. The projection of the pressure-sensing units onto the flat touch sensing layer 130 are disposed in the etching intervals 230.

Figure 3:
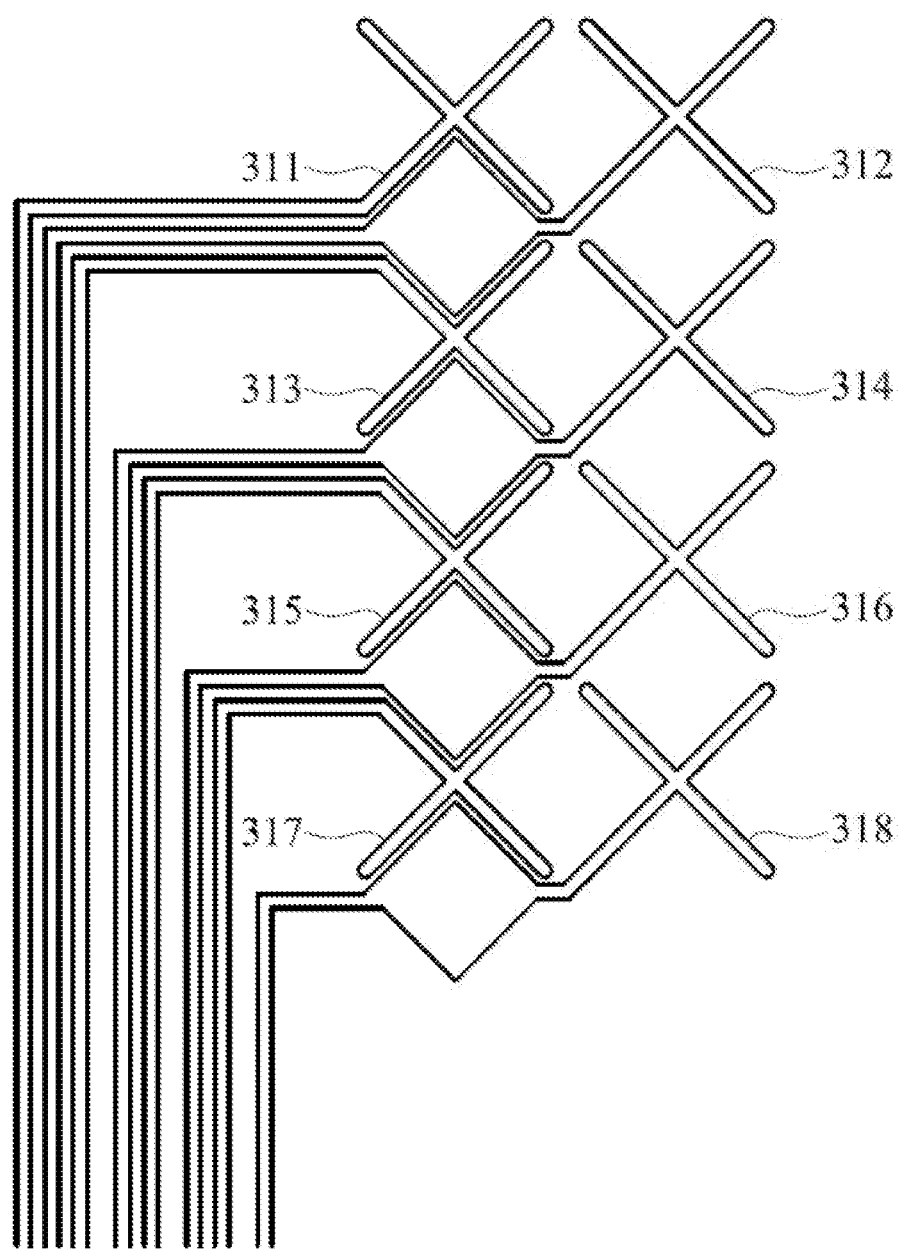
FIG 3 is a schematic diagram of a pressure-sensing layer, in accordance with some embodiments of the disclosure.

FIG. 3 is a schematic diagram of a pressure-sensing layer, in accordance with some embodiments of the disclosure. As shown in FIG. 3, the pressure-sensing layer comprises at least one pressure-sensing unit. For clarity, only pressure-sensing units 311-318 are shown in FIG. 3. In some embodiments, each of the pressure-sensing units 311-318 is a radial pattern formed by a transparent conductive line. The transparent conductive line is turned in various directions to form the radial pattern. When the user performs a touch action on the protective cover, because the pressure-sensing unit corresponding to the touched position is pressed, the length of the pressure-sensing unit is changed such that the equivalent resistance of the pressure-sensing unit is affected by the touch action. Therefore, when touch actions are performed using different levels of strength, the pressure-sensing unit has different resistances.

For example, when the position touched by the user corresponds to the pressure-sensing unit 311, if the strength of the touch action is great, the amount of change of the resistance of the pressure-sensing unit 311 is great. Alternatively, if the strength of the touch action is weak, the amount of change of the resistance of the pressure-sensing unit 311 is small. Therefore, the strength of the touch action can be determined when the amount of change of the resistance of the pressure-sensing units 311-318 is detected.

Since the fabrication of the pressure-sensing units 311-318 often utilizes the same material, the pressure-sensing unit 311 is given as an example to describe the calculation of the gage factor (GF) of the material. The GF is an important parameter in a selection process for the material of the pressure-sensing unit 311. The GF is expressed by the following equation: $GF=(\Delta R/R)/(\Delta L/L)$, wherein R represents the equivalent resistance when the conductive material is not being touched, $\Delta R$ represents the change in resistance after the conductive material is touched, L represents the length of the conductive material when the conductive material is not being touched, and the $\Delta T$, represents the change in length of the conductive material after the conductive material is touched. In some embodiments, to easily measure the resistance of the conductive material, the GF of the conductive material is greater than about 0.5 to provide better sensitivity.

Figure 4:
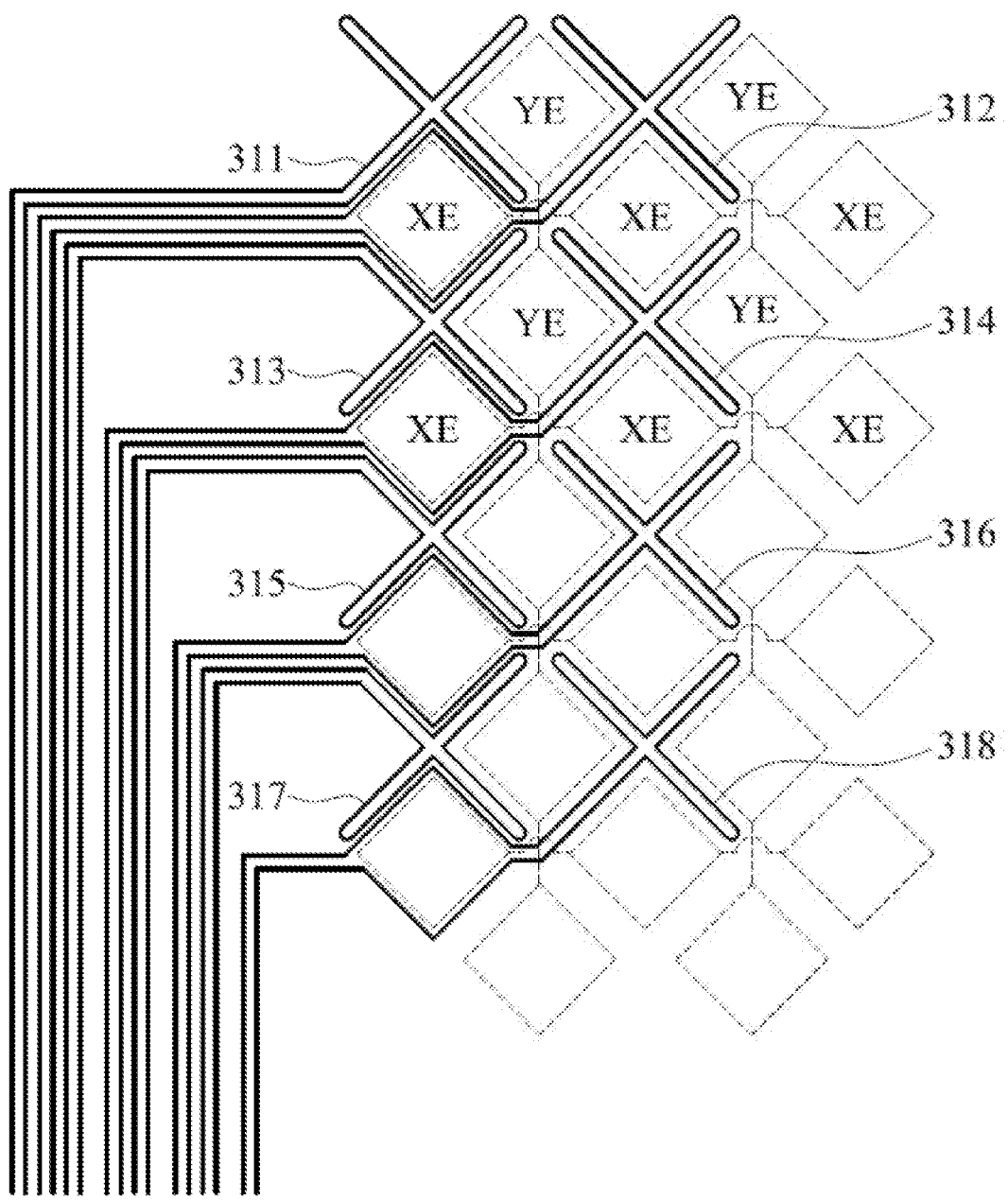
FIGS. 4-6 are schematic diagrams relating to first direction-detection block-formed electrodes, second direction-detection block-formed electrodes shown in FIG. 2, and pressure-sensing units shown in FIG. 3.

FIG. 4 is a schematic diagram relating to the first direction-detection block-formed electrodes XE, the second direction-detection block-formed electrodes YE shown in FIG. 2 and the pressure-sensing units 311-318 shown in FIG. 3. As shown in FIG. 4, the patterns of the pressure-sensing units 311-318 constitute a first pattern. The first direction-detection block-formed electrodes XE and the second direction-detection block-formed electrodes YE constitute a second pattern. The projection of the first pattern on the flat touch sensing layer does not overlap the second patterns. In some embodiments, the projection of the first pattern onto the flat touch sensing layer is located in the etching intervals of the flat touch sensing layer. In some embodiments, the overlap ratio between the projection of the first pattern onto the flat touch sensing layer and the flat sensing pattern 200 of the flat touch sensing layer is less than about 5% of the flat sensing pattern 200.

In some embodiments, the amount of change of the resistances of the pressure-sensing units 311-318 is detected.

The detection results are utilized to obtain the strength of the touch action. The amount of change of the capacitances of the capacitors between the first direction-detection block-formed electrodes XE and the second direction-detection block-formed electrodes YE is detected. The detection results are obtained to determine the touched position. The obtained strength and position are combined to achieve a 3D touch control function.

Figure 5:
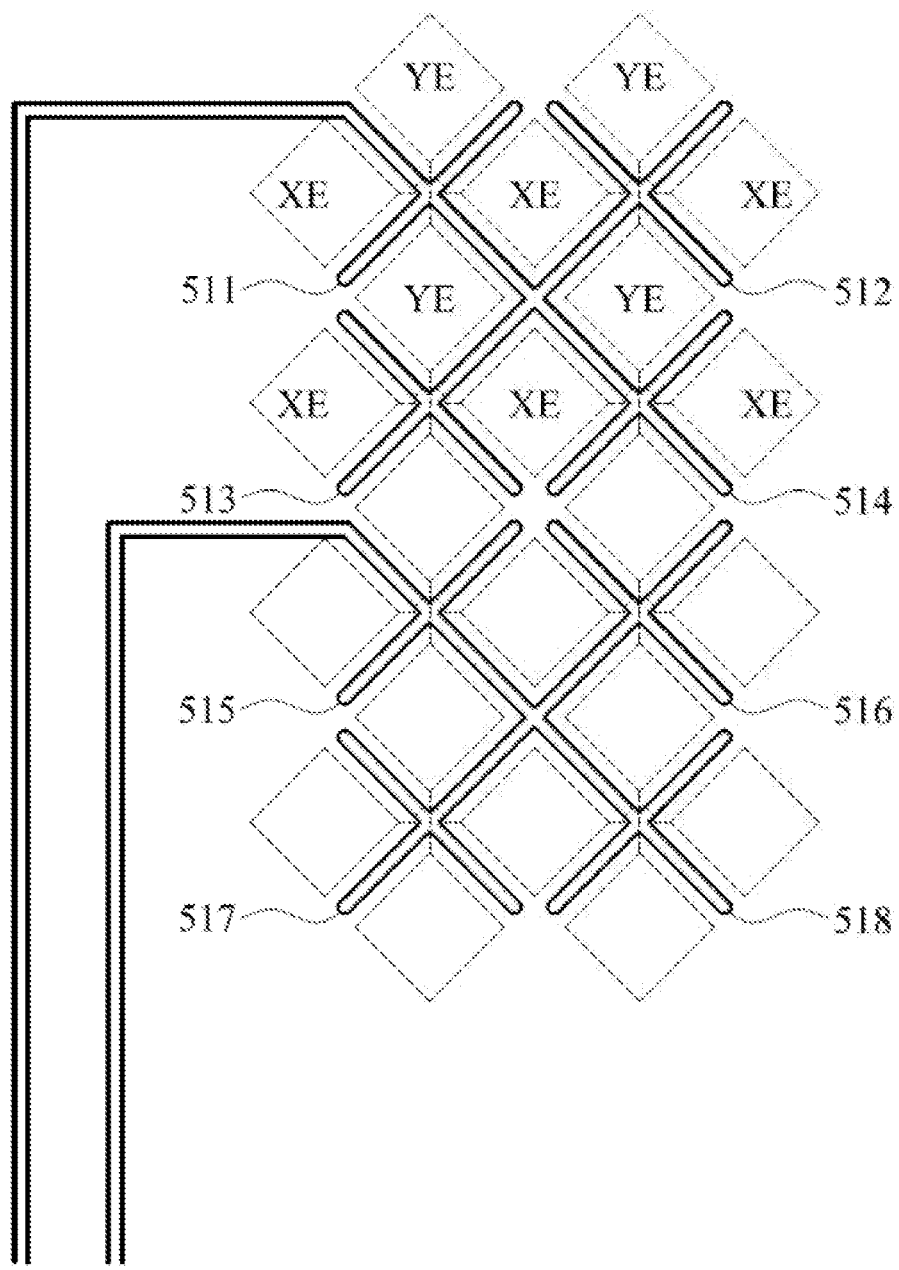
Figure 6:
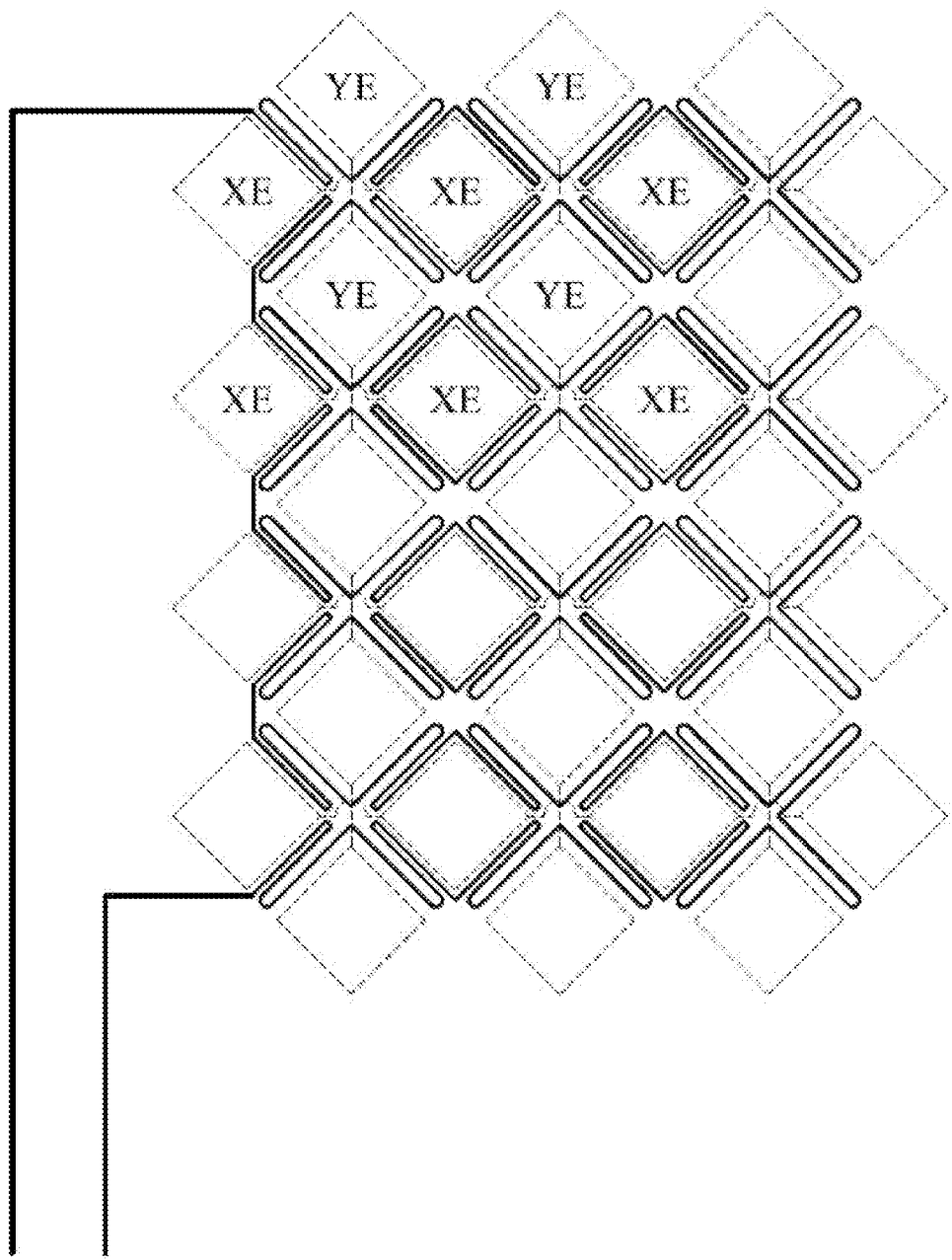

FIGS. 5 and 6 are schematic diagrams of the pressure-sensing layer, in accordance with other embodiments of the disclosure. Refer to FIG. 5, the number of pressure-sensing units is 2 or more. The same transparent conductive line is turned in various directions to form at least two pressure-sensing units, such as 511 and 512. Referring to FIG. 6, the number of pressure-sensing units is 2 or more. A single transparent conductive line is turned in various directions to form all pressure-sensing units. Compared with FIG. 3, the detection circuits in FIG. 5 or FIG. 6 are fewer in number than the detection circuits in FIG. 3. Therefore, the layout area of all detection circuits and control circuits corresponding to the touch control device is reduced.

Furthermore, although FIGS. 3, 5 and 6 disclose different patterns for the pressure-sensing units, the disclosure is not limited thereto. In some embodiments, at least one of the patterns in FIGS. 3, 5 and 6 serves as the pattern in the pressure-sensing layer.

In some embodiments, the pressure-sensing units cover a visible region of the touch control device. In some other embodiments, the pressure-sensing units do not cover the visible region of the touch control device. The pressure-sensing units are only formed in a specific region of the visible region, such as the upper left or the upper right. When the user touches the upper left of the touch control device (corresponding to the upper left of the pressure-sensing layer), the resistance of the corresponding pressure-sensing unit is changed. The volume or the brightness of the touch control device may be adjusted according to the strength of the touch action. Additionally, since the pressure-sensing layer 120 approaches the service side of the touch control device, the detection sensitivity of the touch control device can be increased. Furthermore, the pressure-sensing units and the detection electrodes are combined to achieve 3D touch control functionality.

Figure 7A:
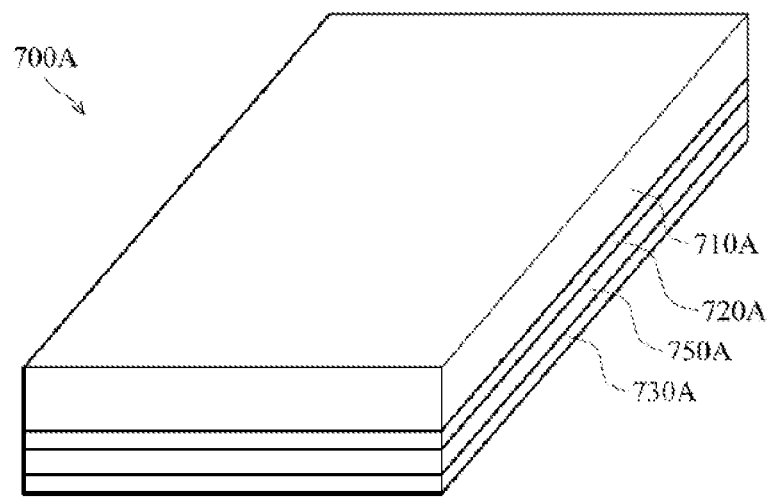
FIGS. 7A-7C and 8A-8C are schematic diagrams of a touch control device, in accordance with other embodiments of the disclosure.
Figure 7B:
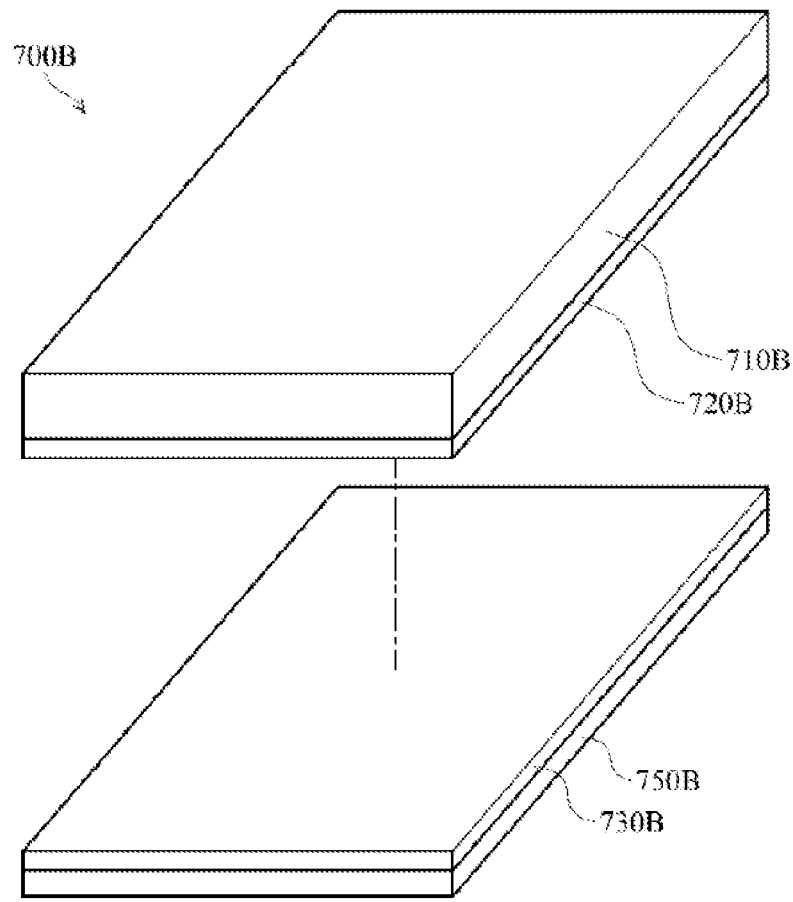
Figure 7C:
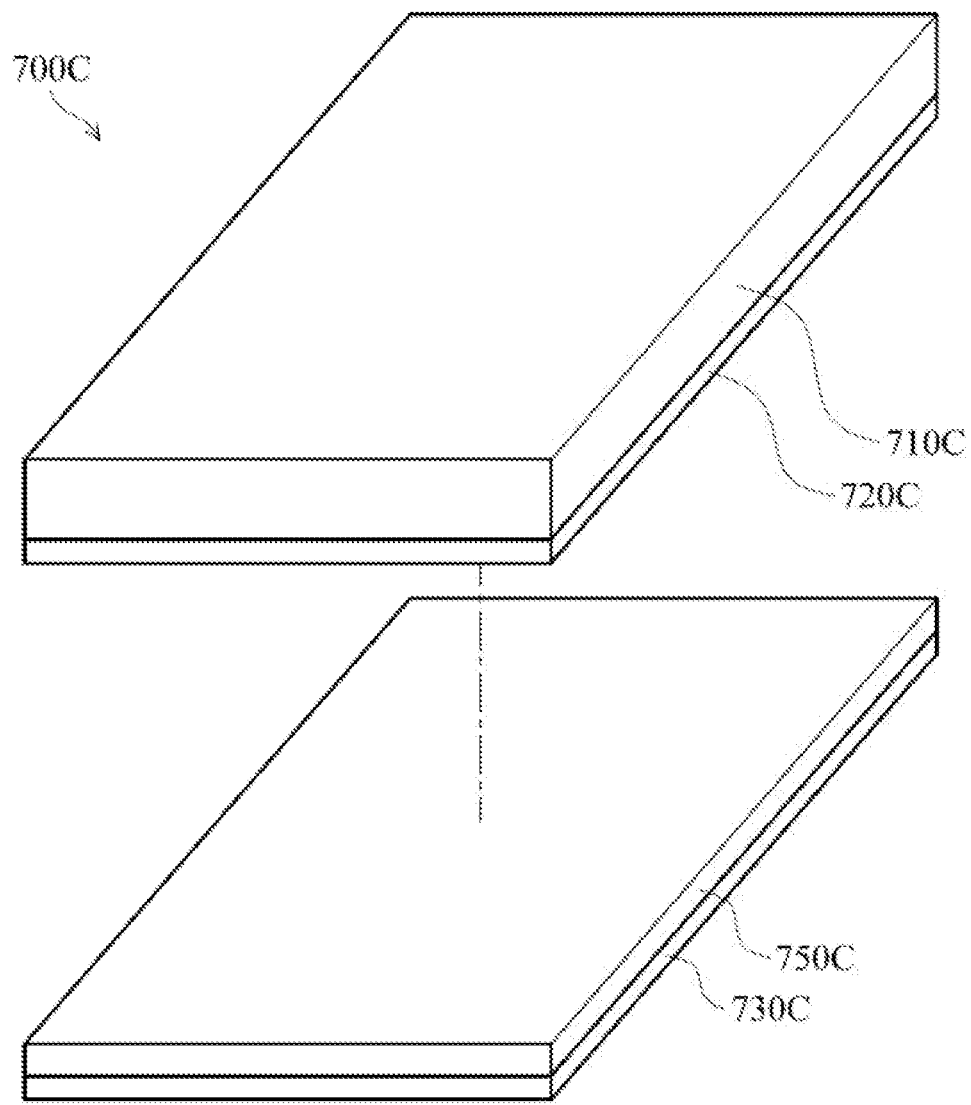

FIGS. 7A-7C are schematic diagrams of a touch control device, in accordance with other embodiments of the disclosure. Referring to FIG. 7A, the touch control device 700A comprises a protective cover 710A, a pressure-sensing layer 720A, a flat touch sensing layer 730A and an insulating planar layer 750A. The pressure-sensing layer 720A is formed under the protective cover 710A. The insulating planar layer 750A is formed under the pressure-sensing layer 720A. The flat touch sensing layer 730A is formed under the insulating planar layer 750A. The pressure-sensing layer 720A and the flat touch sensing layer 730A are formed under the protective cover 710A. The insulating planar layer 750A isolates the pressure-sensing layer 720A and the flat touch sensing layer 730A. Since no substrate is disposed between the pressure-sensing layer 720A and the flat touch sensing layer 730A, the cost can be reduced.

The insulating planar layer 750A is configured to smooth the patterns on the pressure-sensing layer 720A and the flat touch sensing layer 730A and isolate the pressure-sensing layer 720A and the flat touch sensing layer 730A to avoid the electrical properties of the pattern on the pressure-sensing layer 720A interfering with the electrical properties of the pattern on the flat touch sensing layer 730A. In some embodiments, the material of the insulating planar layer 750A is polyimide (PI). In some embodiments, an automatic coating machine is utilized to handle an insulation material to become a flat uniform film.

Referring to FIG. 7B, the touch control device 700B comprises a protective cover 710B, a pressure-sensing layer 720B, a flat touch sensing layer 730B and a substrate 750B. The pressure-sensing layer 720B is formed under the protective cover 710B. The flat touch sensing layer 730B is formed on the substrate 750B. In some embodiments, the pressure-sensing layer 720B is attached to the flat touch sensing layer 730B by an optically clear adhesive. In some embodiments, the substrate 750B is a display panel. The display panel may comprise liquid-crystal components, organic light-emitting diodes (PLEDs) or plasma components.

Refer to FIG. 7C, the touch control device 700C comprises a protective cover 710C,. a pressure-sensing layer 720C a flat touch sensing layer 730C and a substrate 750C. The pressure-sensing layer 720C is formed under the protective cover 710C. The flat touch sensing layer 730C is formed under the substrate 750C. In some embodiments, the substrate 750C is attached with the pressure-sensing layer 720C by an optically clear adhesive.

Figure 8A:
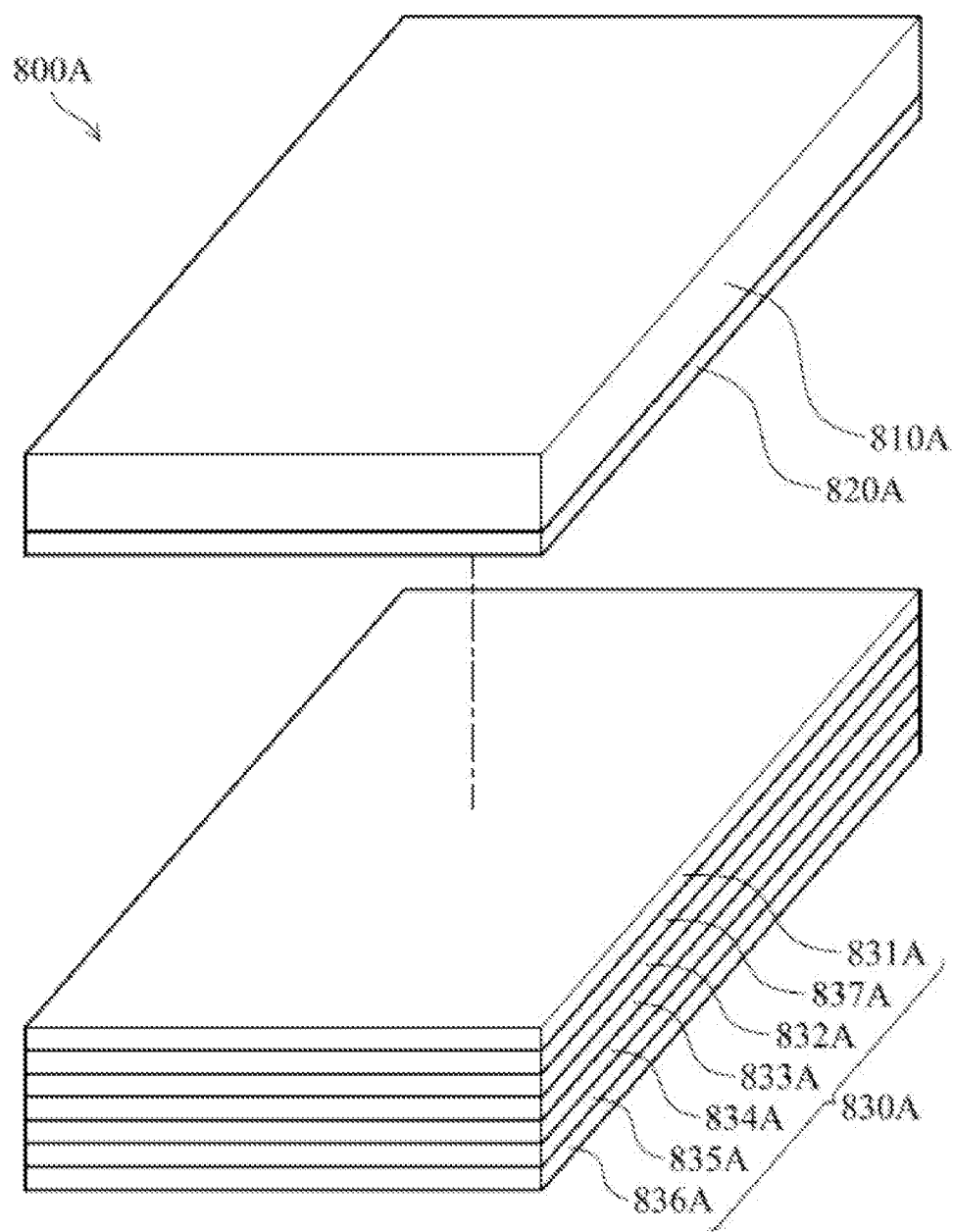
Figure 8B:
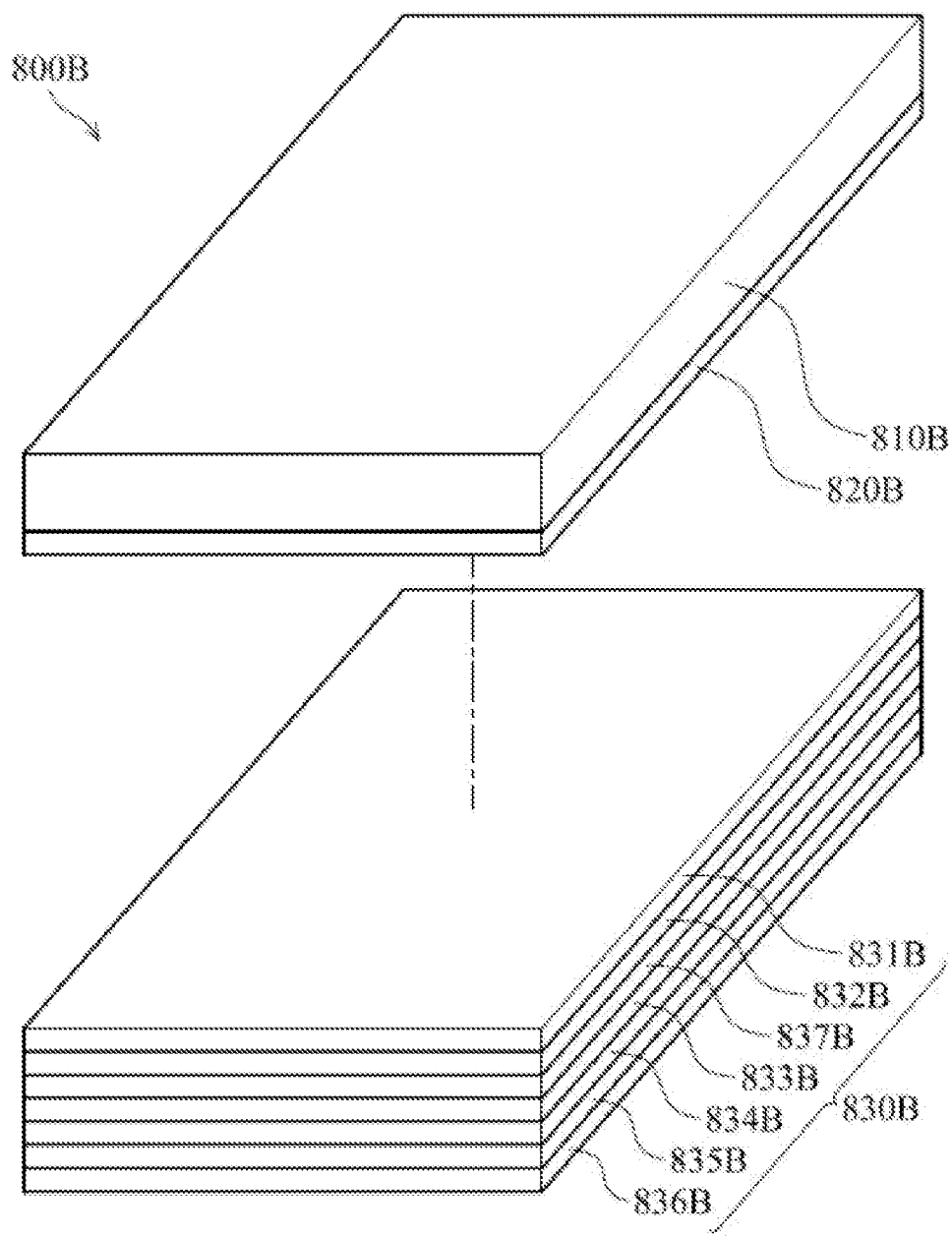
Figure 8C:
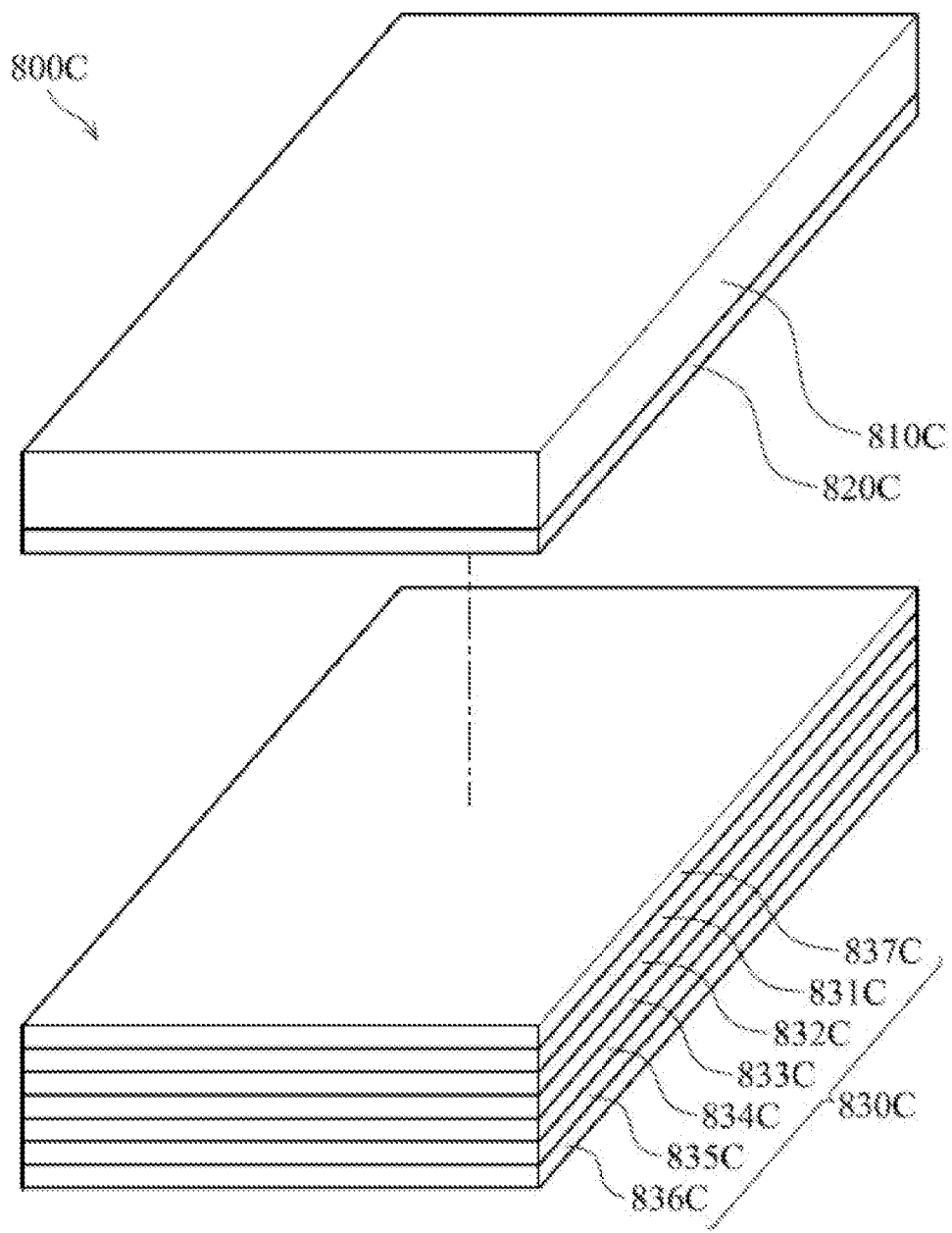

FIGS. 8A-8C are schematic diagrams of touch control devices, in accordance with other embodiments of the disclosure. As shown in FIG. 8A, the touch control device 800A comprises a protective cover 810A, a pressure-sensing layer 820A and a display panel 830A combined with a flat touch sensing layer 837A. The pressure-sensing layer 820A is formed under the protective cover 810A. In some embodiments, the pressure-sensing layer 820A is attached to the display panel 830A by an optically clear adhesive. The disclosure does not limit the kind of display panel 830A. In some embodiments, the display panel 830A may comprise liquid-crystal components, organic light-emitting diodes (OLEDs) or plasma components.

For clarity, a liquid-crystal display panel is given as an example. As shown in FIG. 8A, the display panel 830A comprises a top polarizer 831A, a flat touch sensing layer 837A, a top substrate 832A, a color filter layer 833A, a liquid-crystal layer 834A, a driving layer 835A and a bottom substrate 836A. The flat touch sensing layer 837A is formed under the top polarizer 831A. The top substrate 832A is formed under the flat touch sensing layer 837A. The color filter layer 833A is formed under the top substrate 832A. In some embodiments, the color filter layer 833A comprises a plurality of color filters. The liquid-crystal layer 834A is formed under the color filter layer 833A. The driving layer 835A is formed under the liquid-crystal layer 834A. In some embodiments, the driving layer 835A comprises a plurality of thin film transistors. The bottom substrate 836A is formed under the driving layer 835A.

FIG. 8B is similar to FIG. 8A with the exception that the flat touch sensing layer 837B shown in FIG. 8B is formed between the top substrate 832B and the color filter layer 833B. FIG. 8C is similar to FIG. 8A with the exception that the flat touch sensing layer 837C shown in FIG. 8C is formed on the top surface of the top polarizer 831C. Since the principles of other semiconductor layers shown in FIGS. 8B and 8C are the same as that shown in FIG. 8A the descriptions of FIGS. 8B and 8C are omitted. In some embodiments, the flat touch sensing layer is formed between a color filter layer and a liquid-crystal layer or between a liquid-crystal layer and a driving layer. The flat touch sensing layer is formed between a driving layer and a bottom substrate or under a bottom surface of a bottom substrate.

Unless otherwise defined, all terms (including technical and scientific terms) used herein have the same meaning as commonly understood by one of ordinary skill in the art to Which this disclosure belongs. It will be further understood that terms, such as those defined in commonly used dictionaries, should be interpreted as having a meaning, that is consistent with their meaning in the context of the relevant art and will not be interpreted in an idealized or overly formal sense unless expressly so defined herein.

While the disclosure has been described by way of example and in terms of the preferred embodiments, it is to be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A touch control device, comprising:
    a protective cover configured to protect the touch control device and comprising a top-surface to sustain a touch action performed by a user;
    a flat touch sensing layer comprising a plurality of first direction-detection electrodes and a plurality of second direction-detection electrodes, wherein:
        the first direction-detection electrodes are isolated from the second direction-detection electrodes by a transparent insulating material disposed at a position where the first direction-detection electrodes cross the second direction-detection electrodes, and
        the first direction-detection electrodes and the second direction-detection electrodes constitute a flat sensing pattern; and
    a pressure-sensing layer disposed between the protective cover and the flat touch sensing layer and comprising at least one pressure-sensing unit constituting a first pattern, wherein an overlap ratio between a projection of the first pattern onto the flat touch sensing layer and the flat sensing pattern is less than or equal to about 5% of the flat sensing pattern.

2. The touch control device as claimed in claim 1, wherein:
    each of the first direction-detection electrodes comprises a plurality of first direction-detection block-formed electrodes and a plurality of first connection lines, and
    each of the first connection lines is electrically connected to neighboring first direction-detection block-formed electrodes,
    each of the second direction-detection electrodes comprises a plurality of second direction-detection block-formed electrodes and a plurality of second connection lines,
    each of the second connection lines is electrically connected to neighboring second direction-detection block-formed electrodes,
    the first direction-detection block-formed electrodes and the second direction-detection block-formed electrodes constituting a second pattern, and
    a projection of the second pattern onto the pressure-sensing layer does not overlap the first pattern.

3. The touch control device as claimed in claim 2, wherein:
    the first direction-detection block-formed electrodes and the second direction-detection block-formed electrodes are formed on a surface of a substrate, there is an etching interval between each of the first direction-detection block-formed electrodes and each of the second direction-detection block-formed electrodes, and
    the projection of the first pattern onto the flat touch sensing later is positioned in the etching intervals.

4. The touch control device as claimed in claim 1, wherein the at least one pressure-sensing unit has a radial shape.

5. The touch control device as claimed in claim 4, wherein a transparent conductive line is turned in at least one direction to form a radial pattern serving as the at least one pressure-sensing unit.

6. The touch control device as claimed in claim 5, wherein a gage factor of the transparent conductive line is greater than about 0.5.

7. The touch control device as claimed in claim 5, wherein a line width of the transparent conductive line is 3 µm-5 µm.

8. The touch control device as claimed in claim 4, wherein:
    the pressure-sensing layer comprises a plurality of pressure-sensing units, and
    a transparent conductive line is turned in at least one direction to form a plurality of radial patterns, or a slender conductive line is turned in at least one direction to form at least two of the pressure-sensing units.

9. The touch control device as claimed in claim 8, wherein a gage factor of the transparent conductive line is greater than about 0.5.

10. The touch control device as claimed in claim 8, wherein a line width of the transparent conductive line is 3 µm-5 µm.

11. The touch control device as claimed in claim 1, further comprising:
    a substrate comprising a first surface and a second surface opposite to the first surface, wherein:
        the flat touch sensing layer is formed on the first surface and
        the pressure-sensing layer is formed on the second surface and attached to the protective cover.

12. The touch control device as claimed in claim 1, wherein the pressure-sensing layer is directly disposed on an under surface of the protective cover.

13. The touch control device as claimed in claim 12, further comprising:
    an insulating planar layer directly disposed under the pressure-sensing layer, wherein the flat touch sensing layer is directly disposed under the insulating planar layer.

14. The touch control device as claimed in claim 12, further comprising:
    a substrate, wherein:
        the flat touch sensing layer is formed on the substrate, and
        the flat touch sensing layer is attached to the pressure-sensing layer by an optically clear adhesive.

15. The touch control device as claimed in claim 12, further comprising:
    a substrate, wherein:
        the flat touch sensing layer is formed under the substrate, and
        the substrate is attached to the pressure-sensing layer by an optically clear adhesive.

16. The touch control device as claimed in claim 12, further comprising:
    a display panel, wherein:
        the flat touch sensing layer is directly disposed on the display panel, and the flat touch sensing layer is attached to the pressure-sensing layer by an optically clear adhesive.

17. The touch control device as claimed in claim 12, further comprising:
- a display panel comprising:
  - a top polarizer;
  - a top substrate disposed under the top polarizer;
  - a color filter layer disposed under the top substrate;
  - a liquid-crystal layer disposed under the color filter layer;
  - a driving layer disposed under the liquid-crystal layer; and
  - a bottom substrate disposed under the driving layer, wherein the flat touch sensing layer is located in the display panel.

18. The touch control device as claimed in claim 17, wherein the flat touch sensing layer is disposed on the top polarizer.

19. The touch control device as claimed in claim 17, wherein the flat touch sensing layer is disposed between the top polarizer and the top substrate.

20. The touch control device as claimed in claim 17, wherein the flat touch sensing layer is disposed between the top substrate and the color filter layer.

* * * * *